United States Patent [19]

West

[11] 4,002,881
[45] Jan. 11, 1977

[54] SYSTEM FOR CONTROLLING ELECTICAL POWER IN AN INTERNAL WIRE IMPEDANCE HEATING SYSTEM

[75] Inventor: James M. West, Englewood, Colo.

[73] Assignee: Chevron Research Company, San Francisco, Calif.

[22] Filed: June 13, 1974

[21] Appl. No.: 479,000

[52] U.S. Cl. .............................. 219/301; 137/341; 138/33; 219/10.51; 219/510; 307/77

[51] Int. Cl.² ....................... H05B 1/02; F24H 1/10; F16L 53/00

[58] Field of Search ............... 219/300, 301, 10.51, 219/10.49, 509, 510; 137/341; 138/33; 307/77, 83, 5.7, 69, 78

[56] References Cited

UNITED STATES PATENTS

| 1,567,844 | 12/1925 | Hendricks | 307/77 |
|---|---|---|---|
| 3,293,407 | 12/1966 | Ando | 219/301 |
| 3,523,177 | 8/1970 | Ando | 219/300 |
| 3,571,561 | 3/1971 | Ando | 219/300 |
| 3,755,650 | 8/1973 | Ando | 219/300 |

Primary Examiner—A. Bartis
Attorney, Agent, or Firm—R. L. Freeland, Jr.; R. T. Kloeppel

[57] ABSTRACT

An apparatus for heating fluids includes a pipe through which the fluid to be heated flows having a ferromagnetic pipe attached in heat-transmitting relationship thereto. An insulated wire extends longitudinally through the ferromagnetic pipe and is electrically connected in series therewith. The secondary windings of a pair of transformers are connected in series with each other and the ferromagnetic pipe by the insulated wire and the primary windings of the transformers are connected to a source of alternating current. A control responsive to the temperature of the fluid in the fluid conveying pipe is provided for regulating the power output to the series connected ferromagnetic pipe and insulated wire by, in alternative embodiments, disconnecting the transformers from the circuit, reversing the polarity of one transformer secondary with respect to the secondary of the other or bypassing one of the transformers.

12 Claims, 9 Drawing Figures

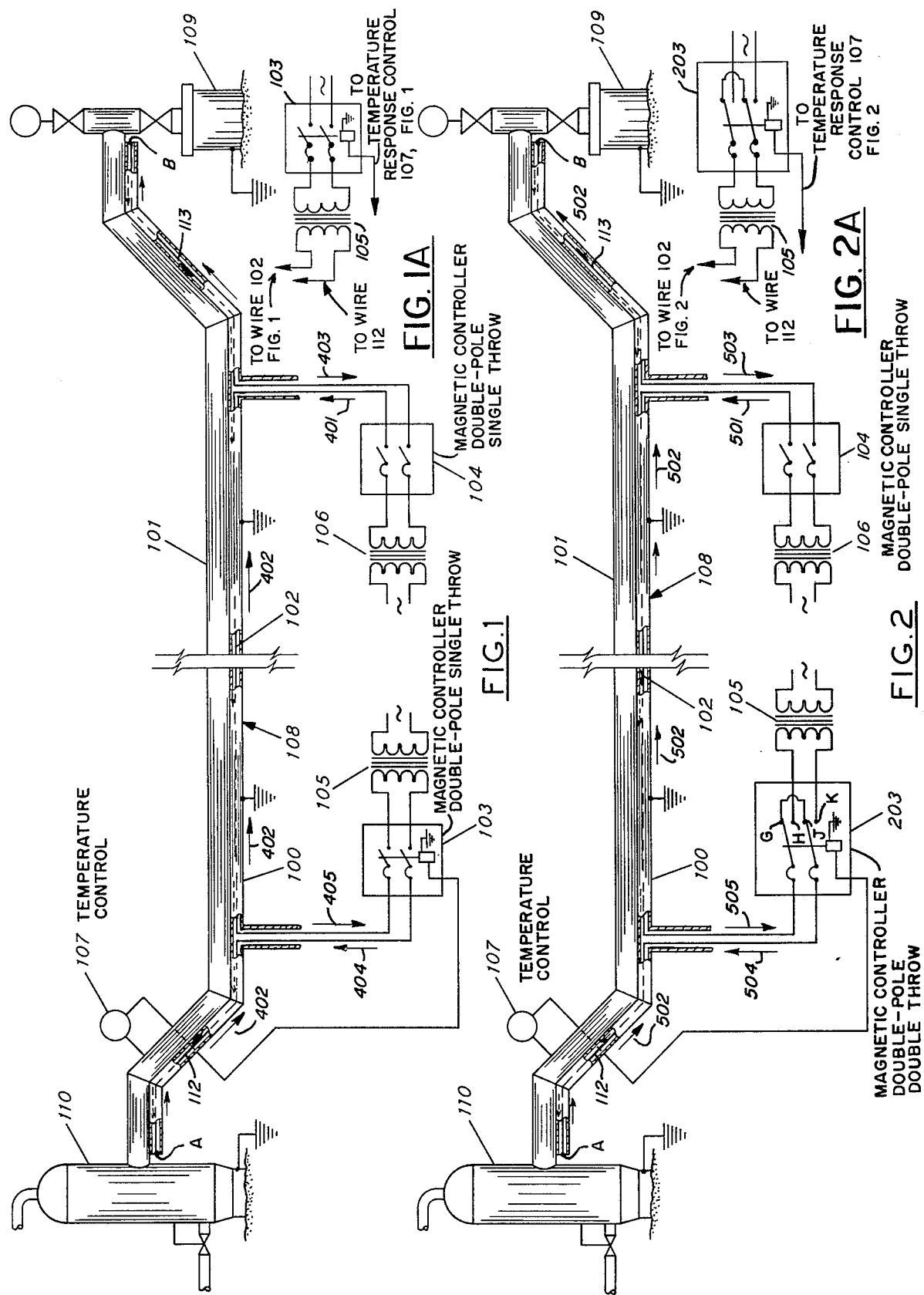

SYSTEM FOR CONTROLLING ELECTICAL POWER IN AN INTERNAL WIRE IMPEDANCE HEATING SYSTEM

BACKGROUND OF THE INVENTION

1. Field of the Invention

This invention relates to a system for controlling and feeding electrical power to heaters for long fluid-flow pipes. More specifically, the present invention provides a system for controlling and feeding electrical power to an internal wire impedance system for heating long flow lines.

2. Description of the Prior Art

Long-distance pipelines often require the fluid flowing in them to have lower viscosities than they would have at ambient temperature of the pipe. In order to reduce the viscosity of the fluid, heat is generally transferred into the fluid. A way to achieve this is through steam tracing, that is, a system which uses steam flowing in a separate conduit adjacent to the one transporting the fluid. Another system is one using alternating current and the effects of a magnetic field produced by it to increase the temperature of the fluid in the flow pipe. This second method has in the past been called "skin effect heating," or more correctly, "internal wire impedance heating."

Industrial practice has used the skin effect or internal wire impedance heating which, under current practice, uses a ferromagnetic pipe attached substantially parallel and either interior or exterior to a fluid-flow pipe. The ferromagnetic pipe has longitudinally extending through it an insulated copper wire in series with both an alternating current (AC) source of power and the ferromagnetic pipe. A theoretical explanation of the operation is that electric current flows through the insulated wire and returns back on the inside wall of the ferromagnetic pipe due to the skin effect, with no current flowing on the outside wall.

In prior installations of this system which I am aware of, single-point power connections to the internal insulated wire are used. The arrangement necessitates the use of high-voltage switch gear as well as high-voltage insulation on the internal insulated wire. Additionally, for the high voltages required to heat a relatively long pipeline, specially designed high-voltage transformers are required, resulting in high costs and long waits for delivery of such special equipment.

The present invention includes an arrangement which permits the use of readily available and less costly standard equipment.

SUMMARY OF THE INVENTION

This invention provides a novel system to control and feed electrical power to long internal wire-insulated systems by using a plurality of transformer feed points or power sources. The respective transformers are located at special input locations along the internal wire impedance system heater. A temperature-responsive control is installed to measure either the temperature of the fluid or the temperature of the pipe surface at a desired point which may be near the outlet of the flow pipe. The control actuates a magnetic controller such as a relay to connect a heating wire to selected transformers in a circuit. In response to a signal from the temperature control, the magnetic controller may disconnect certain selected transformers, while sequentially completing the power circuit. Thus, the system receives voltage from the remaining transformers; and, as a result, the internal wire impedance system heater runs on less power input with a correspondingly reduced heating effect. The objective of this arrangement is to produce a heater that will cycle between a full heat load and a partial heat load output on a signal from a single outlet temperature control. Likewise, other transformers may be connected into the circuit or the entire system may be disconnected in this manner.

Further, the present invention may be arranged to reverse the polarity of selected transformers on a signal from the temperature-responsive control. The reverse polarity causes the internal wire impedance system heater to be fed by only the difference of voltages of the selected transformers.

BRIEF DESCRIPTION OF THE DRAWINGS

The drawings illustrate by way of example several embodiments of the present invention. In the drawings like reference numbers are used to indicate similar parts in each figure. These drawings and the description of the preferred embodiment which follow will demonstrate the features and advantages of the invention but neither are intended to infer limitatons on the invention.

FIG. 1 is a schematic diagram illustrating a two-transformer system of the preferred embodiment.

FIG. 1A illustrates an alternate way of connecting the left controller shown in FIG. 1 to the power source.

FIG. 2 is a schematic diagram illustrating the present invention arranged so that one of the two transformers may be disconnected from the circuit on a signal from the temperature controller.

FIG. 2A illustrates an alternate way of connecting the double pole double throw controller of FIG. 2 to the power source.

DESCRIPTION OF THE PREFERRED EMBODIMENT

Figure 5:
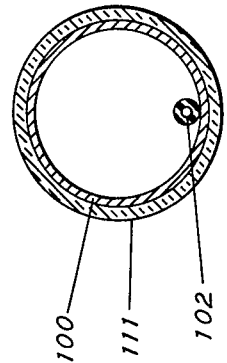
FIG. 5 illustrates a cross-section of an alternate embodiment of the present invention.

In FIG. 1, a heat-generating pipe 100 of ferromagnetic material is secured in a heat transmitting relationship to the outer surface of a fluid flow pipe 101 which interconnects wellhead 109 to storage tank 110. Certain situations, however, may warrant either locating the pipe 100 within the flow pipe 101 or eliminating the flow pipe 101 and allowing the fluid to flow within pipe 100, FIG. 5. FIG. 1 further illustrates the heat-generating pipe 100 extending continuously in a longitudinal direction along the fluid flow pipe 101, and as shown, pipe 100 may be grounded at various intervals. Extending longitudinally inside pipe 100 is an insulated wire means such as an insulated copper wires 102, 112, and 113. These wires are electrically connected in series with the pipe 100 at one end to form a return path for alternating current. Likewise, the wire 102 may be connected in series with a power source such as through the secondary windings of the transformers 105 or 106. In the embodiment of the invention where the fluid flows within pipe 100, FIG. 5, the insulation on the wires 102, 112 and 113 desirably has properties compatible with the fluid to minimize insulation deterioration and maximize flow characteristics.

The wire's length in the ferromagnetic pipe is determined by the length over which the fluid is to be heated in a fluid flow pipe. For example, for construction purposes, it may be desirable to install a ferromagnetic pipe 20 feet long, but it may be desirable to heat the fluid for only 15 feet of this pipe length. In this case, a predetermined length of wire approximately 15 feet is required. Thus, a predetermined length of wire — as determined by a person skilled in the art — is the length needed to provide the required heat over length of fluid pipe in which a fluid flowing in the pipe is to be heated.

Figure 6:
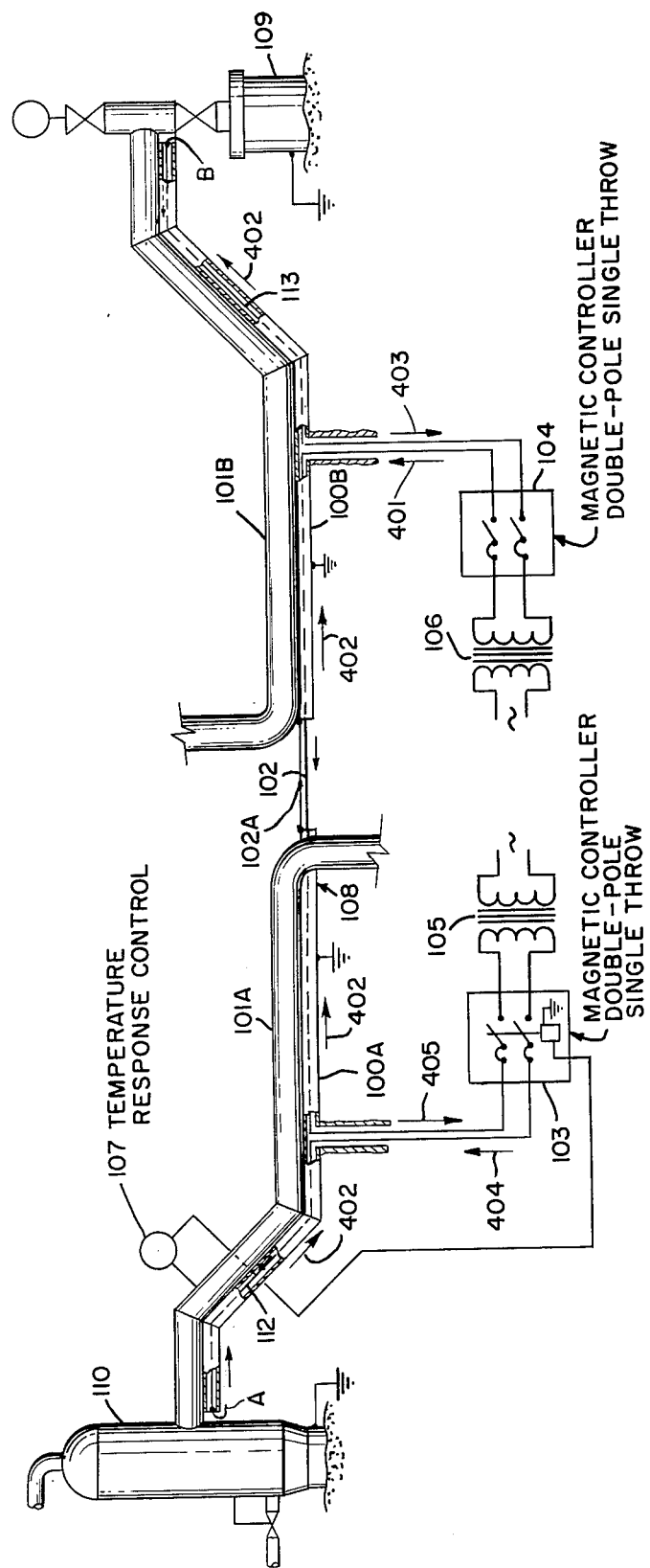
FIG. 6 illustrates the present invention when used with a plurality of pipes.

Alternatively, this invention may use a discontinuous ferromagnetic pipe as shown in FIG. 6. An example of this may occur in an oil refinery where it may be desirable to heat short individual pipelines. In such a situation, the ferromagnetic pipe may end at the termination of one pipeline and begins again at the commencement of another with each ferromagnetic pipe section connected in series with an electrical conductor; the insulated wire conductor 102A within the pipe, however, is continuous.

Further illustrated in FIG. 1 is a controller means such as magnetic controller 103, and an optional fused manual disconnect switch 104 respectively connectable in series to the secondary winding of a pair of voltage transformers 105 and 106. The primary windings of transformers 105 and 106 are connected to an alternating current source of power. The magnetic controller 103 is actuated by temperature-responsive control means 107 which measures the temperature of the wall of the fluid flow pipe 101; alternatively, it can instead measure the temperature of the fluid flowing in the pipe 101. In short, the magnetic controller 103 and the temperature responsive control 107 are examples of a means for connecting and disconnecting from the series circuit a selected transformer. Thus any controller 103, 203 or 303 with temperature response control 107 are means for energizing and de-energizing in the series circuit selected secondary or primary windings of a transformer.

Figure 4:
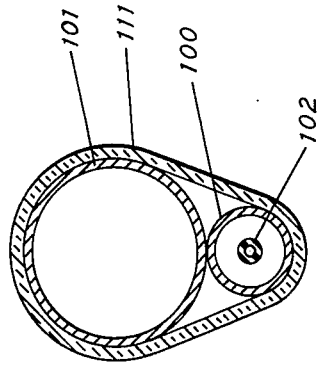
FIG. 4 illustrates a cross-section of an embodiment of the present invention.

A cross-section of a preferred embodiment is shown in FIG. 4. In this cross-section it is evident that the fluid flow pipe 101 is in contact with the pipe 100. The means for securing the ferromagnetic pipe 100 to pipe 101 may be by welding or steel clamps. To minimize heat losses, the combination of fluid pipe 101 and heater pipe 100 is covered by insulation 111.

FIG. 2 illustrates a modified arrangement of the present invention. In this embodiment the magnetic controller 203 on a signal from the temperature-responsive control means 107 disconnects transformer 105 from the circuit while reconnecting the secondary winding of transformer 106. To successfully accomplish the foregoing, the optional disconnect switch 104 must be closed. Using this arrangement, the heater system 108 receives voltage from transformer 106 only, resulting in the heating system running at reduced voltage to produce one-quarter or less power input to the system 108. Heat output will have a corresponding reduction.

Figure 3:
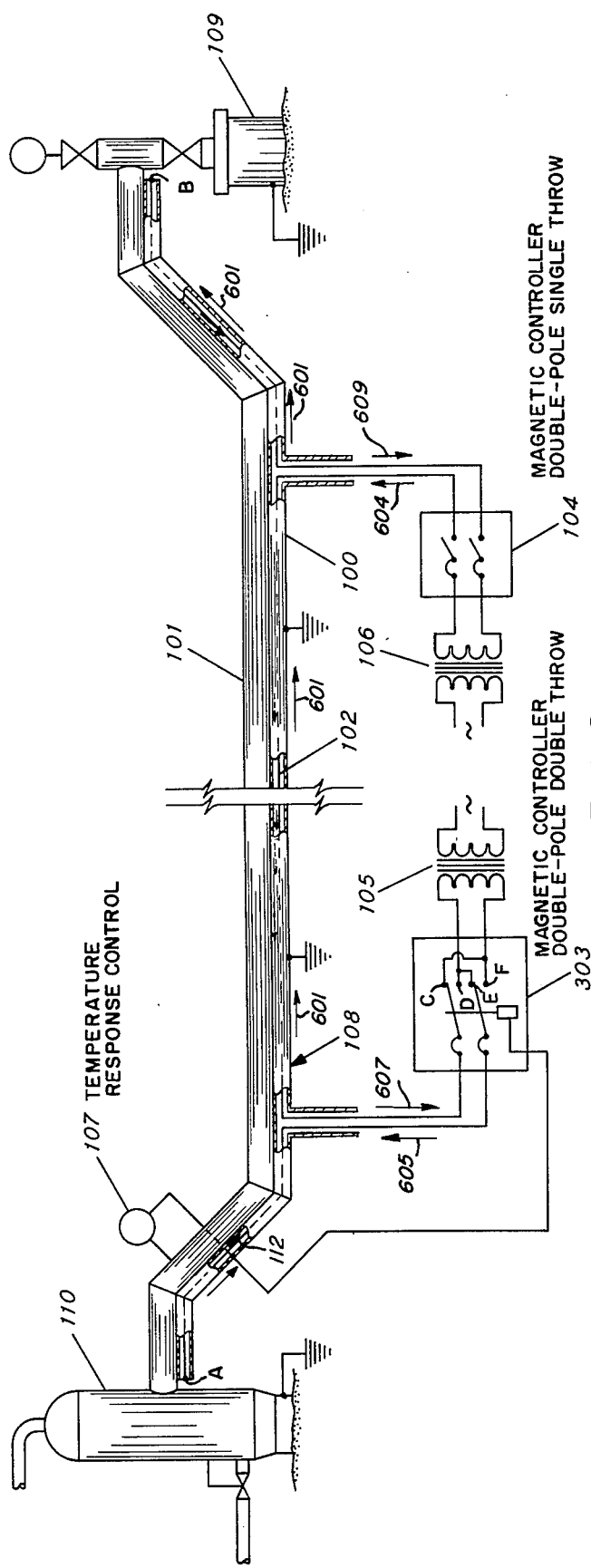
FIG. 3 is a schematic diagram illustrating the present invention arranged to reverse the polarity of one of the two transformers of an embodiment of the invention in relation to the other.

The arrangement of the embodiment of the present invention illustrated in FIG. 3 allows the polarity of transformer 105 to be reversed on a signal from the temperature control means 107, provided the optional disconnect switch 104, is closed. This is accomplished by the circuitry in the magnetic controller 303 which reverses the connections of the wire means 102 to the transformer 105 so that they are connected to opposite terminals of the transformer 105 from what they were before. In this arrangement the two transformers 105 and 106 are of different voltage outputs; alternatively, there may be other means for supplying different voltages such as variable transformers. By reversing the polarity of one of the two transformers, for example, 105, the heater 108 is fed by only the voltage difference between the transformers 105 and 106 resulting in less heat output. It is recommended, though not necessary, that transformer 105 have a voltage output approximately twice as much as transformer 106 to achieve a significant heat output from pipe 100.

Also noteworthy of this invention and its embodiments illustrated in FIGS. 1, 2 and 3 is that it can operate without the magnetic controller, temperature-responsive control and fused disconnect switch. In order to accomplish the foregoing, the predetermined lengths of wires 102, 112, 113 are connected in series with the secondary windings of transformers 105 and 106 while their primary windings are connected to alternating current sources of power having the same or different voltages. Additionally, the ferromagnetic pipe can take any convenient shape. Moreover, the transformers may be disconnected at the primaries instead of at the secondaries, and in place of the transformers, any other power source such as that provided by utility companies may be used at the special input locations along the insulated wires 102, 112, and 113 102.

In summary, the present invention permits control of long electrical heaters from one point by connecting all transformers or power sources in series at a single control point through a controller means such as a magnetic controller, mechanical or pneumatic switch. The one point control is possible even when additional segments of the heat-generating pipe are connected in series with a system in accordance with this invention. Additionally, by using the arrangement of the preferred embodiment illustrated in FIG. 2, long internal wire impedance heaters can use standard-voltage transformers and standard voltage insulated wire that are readily available, eliminating high-voltage equipment of relatively higher cost.

Further, the embodiments of the present invention shown in FIGS. 2 and 3 provide a system for better controlling the heater at various heat output levels. As a result, power demand cost is minimized. These embodiments also permit varying the heat output to match seasonal temperatures where such variations are significant.

The following will describe the current flow to and from each transformer shown in FIG. 1, 2 and 3. When (FIG. 1) the contacts of both magnetic controllers 103 and 104 are in a closed position, a complete series circuit for electrical current is formed. On the other hand, if either or both 103 and 104 are open, no current flows. When the circuit is completed, instantaneous current flow, as indicated by the arrows 401 and 405 in FIG. 1, is from the secondary winding of transformer 106 through the contacts of controller 104 along electric wire 102 through the contacts of controller 103 and the secondary winding of transformer 105 and then through wire 112, as indicated by arrow 404 to end A of pipe 100. At this point, wire 112 is electrically connected to the pipe. For example, it can be connected to the interior of the wall, within the wall, or to the exterior surfaces of the wall so that the electric current can flow within the wall. Only a connection to the interior of the wall is shown, however. The current then flows within the pipe wall as indicated by arrow 402 to the opposite end B of the pipe segment, and through wire 113 to complete the series circuit through the contacts of controller 104 and the secondary of transformer 106 as indicated by arrow 403.

The above describes the flow of current when transformers 105 and 106 are in a series-aiding relationship. Conversely, when the current flow from the transformers are in a series-opposing relationship, the resulting total current flow is reduced. Nonetheless, the current flow is the same as described above.

FIG. 1 permits two transformers to be connected within a heating system so that lower voltage transformers are usable while still providing the necessary amount of heat output. The means for putting the controllers into the series circuit in a series-aiding or opposing (not shown) relationship is temperature response control 107 which responds to the temperature of the flowing fluid. It will open or close controller 103 which either breaks or completes the series circuit formed by: pipe 100, wires 102, 112, 113, transformers 105 and 106, and the contacts of controllers 103 and 104.

FIG. 1A shows another way of connecting transformer 105 in the above-noted series circuit through controller 103. Here the secondary winding is directly connected in series and the primary is in circuit with the contacts of the controller. Though not illustrated, this connection can also be used with transformer 106 and controller 104 in FIGS. 1, 2, 3 and 4.

FIG. 2, however, indicates a series circuit where one transformer such as 105 may be taken out of the series circuit while still keeping the circuit a complete one; though, a series circuit with both transformers either aiding or opposing (not illustrated) is also possible. If the contacts of magnetic controller 104 are closed and the contacts of magnetic controller 203 respectively connect wires 102 and 112 to terminals G and J, transformer 105 is by-passed. As a result, the current from transformer 106 flows through controller 104 as indicated by arrows 501 and 505 along wire 102 through controller 203 (by-passing the secondary of transformer 105). The current continues as shown by arrow 504 in wire 112 to end A of pipe 100 where it is electrically connected to the pipe. The connection, here again, may be either to the interior of the wall, within the wall itself, or to the exterior of the pipe. The current then returns within the wall (arrow 502) all the way to opposite end B of pipe 100, where it then flows within the wire 113 back to controller 104 and transformer 106 as indicated by arrow 503.

On the other hand, when the contacts of magnetic controller 203 respectively connect the secondary of transformer 105 directly to wires 102 and 112 at terminals H and K, FIG. 2, the windings of transformers 105 and 106 are in series. The current flows as described above. But, since the transformers are connected in series-opposing relationship, the flow of current is the same except that current is reduced due to the reduction in voltage as is well understood by those skilled in the art.

FIG. 2A shows another way of connecting the power source. In this case the primary of transformer 105 is supplied through the contacts of controller 203.

FIG. 3 shows transformers 105 and 106 connected in circuit so that the voltages are subtractive. That is when magnetic controller 303 respectively connects wires 102 and 112 to terminals C and E, voltage and current from transformer 105 flows in series-opposing relationship. The current flows from transformer 106 within wire 102 (arrows 604 and 607) through controller 303 and transformer 105 and through wire 112 (arrow 605) to end A of pipe 100. Then the current flows along the pipe wall (arrow 601) to the end B of the pipe where it returns through wire 113 back to controller 104 and transformer 105 (arrow 609).

When magnetic controller 303 is connected to terminals D and F and controller 104 is also closed, transformers 105 and 106 are in series-aiding relationship. The current flow is the same as above, but it is increased because voltages of both transformers are additive.

Figure 3A:
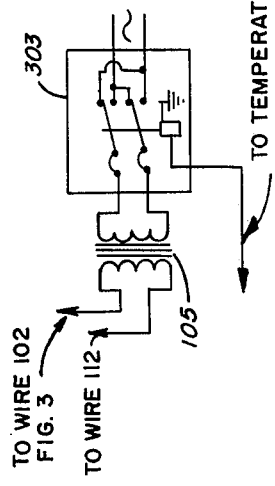
FIG. 3A illustrates an alternate way of connecting the double-pole double-throw controller of FIG. 3 to the source of power.

FIG. 3A illustrates an alternate way of connecting the power source to the controller 303. Thus the primary of the transformer 105 is in circuit with the contacts of the controller.

FIG. 6 illustrates the present invention used with a plurality of fluid pipes 101A and 101B. This embodiment operates in the following manner. When the contacts of both controllers 103 and 104 are in a closed position, a complete series circuit for electrical current is formed. On the other hand, if either or both controllers are open, no current flows. When the circuit is completed instantaneous current flow, as indicated by arrow 401 and 405, is from the secondary winding of transformer 106 through the contacts of controller 104 along electric wire 102 through the contacts of controller 103 and then through the secondary winding of transformer 105 and then out through wire 112, as indicated by arrow 404 to end A of pipe 100A. At this point, wire 112 is electrically connected to pipe 100A. As in all the other embodiments disclosed herein, wire 112 may be connected to the interior of the wall, within the wall, or to the exterior surface of the wall so that electric current can flow within the wall. Only a connection to the interior of the wall is shown, however. The current then flows along the pipe wall of pipe 100A along wire 102A which bridges the gap between pipes 100A and 100B. Note that alternately pipe 100A and 100B may be continuous. Then the current flows along pipe wall 100B to point B of pipe 100B and then through wire 113 to complete the series circuit through the contacts of controller 104 and the secondary of transformer 106 as indicated by arrow 403.

Although only selected arrangements of the present invention have been described in detail, the invention is not to be limited to any specific embodiment but rather only by the scope of the appended claims.

What is claimed is:

1. In combination with an apparatus for electrically heating a fluid in a pipe of the type wherein a ferromagnetic pipe for the fluid has an insulated wire means for conducting alternating current extending within, along, adjacent and electrically in series with a predetermined length of said pipe; the improvement comprising:

a plurality of voltage transformers each having at least a primary and secondary winding;

each of said secondary windings being connectable in said series circuit with each other and said ferromagnetic pipe by predetermined lengths of said insulated wire means;

means for connecting said primary windings to an alternating current source of power, and regulating means responsive to the temperature of the fluid in the pipe for regulating power output to said series circuit from selected ones of said transformers to selectively control current flow in said series circuit in response to the temperature of the fluid in said pipe.

2. The combination of claim 1, wherein said regulating means includes a temperature-responsive means for measuring the temperature of the fluid in said pipe;

means, operable by said temperature-responsive means, for connecting into and disconnecting from said series circuit selected ones of said plurality of transformers to control the flow of alternating current in said wire means according to the temperature measured by said temperatureresponsive means.

3. An improved electrical heating apparatus which improves control of the heat output of said apparatus and permits the use of less costly and readily available voltage transformers and insulated wire, comprising:

a pipe for fluids;

a ferromagnetic pipe;

means for attaching said ferromagnetic pipe along said pipe for fluids in a heat-transmitting relationship thereto;

an insulated wire means for conducting alternating current extending longitudinally inside said ferromagnetic pipe and electrically connected in series with said ferromagnetic pipe;

a plurality of voltage transformers each having at least a primary and secondary winding;

each of said secondary windings being connectable in a series circuit with each other and said ferromagnetic pipe by said wire means;

means for selectively connecting said primary windings to an alternating current source of power; and means responsive to the temperature of the fluid in said fluid pipe for regulating power output to said series circuit from selected ones of said plurality of transformers in response to the temperature of the fluid in said fluid pipe.

4. An improved heat-generating pipe for electrically heating a fluid in a pipe which improves control of the heat output and permits the use of standard voltage transformers and standard voltage insulated wire comprising:

a pipe for fluids;

a ferromagnetic pipe;

means for attaching said ferromagnetic pipe along said pipe for fluids in a heat-transmitting relationship thereto;

an insulated wire means for conducting alternating current extending longitudinally inside said ferromagnetic pipe;

a pair of voltage transformers each having a primary and secondary winding;

each of said secondary windings being connected in a series circuit with each other and said ferromagnetic pipe by predetermined lengths of said wire means;

means, responsive to the temperature of the fluid in said pipe for fluids, for regulating power output to said series circuit from selected ones of said pair of transformers to selectively control current flow in said series circuit in response to the temperature of the fluid in said pipe for fluids; and means for connecting said primary windings to an alternating current source of power.

5. The improved heat-generating pipe of claim 4 wherein said regulating means further comprises temperature-responsive means for measuring the temperature of fluid in said pipe for fluids;

means, operable by said temperature-responsive means, for connecting into and disconnecting from said series circuit selected ones of said pair of transformers to control the flow of alternating current in said wire means according to the temperature measured by said temperature-responsive means; and a fused manual disconnect switch electrically connected to said transformers for manual control of the flow of alternating current in said wire means.

6. The improved heat-generating pipe of claim 4 wherein said regulating means includes means for connecting the secondary winding of one of said pair of transformers in one of a series aiding or opposing relationship to the secondary winding of the other transformer so that power output is respectively increased or decreased to said series circuit.

7. An improved means for better controlling the heat output of an apparatus for electrically heating a fluid, comprising:

a plurality of pipes for fluids;

a plurality of ferromagnetic pipes;

means for electrically connecting each of said ferromagnetic pipes in series with each other;

means for attaching said ferromagnetic pipes along each of said fluid flow pipes in a heat-transmitting relationship thereto;

an insulated wire means for conducting alternating current extending longitudinally inside each of said ferromagnetic pipes and electrically connected in series therewith up to the point where heat is desired in one of said ferromagnetic pipes;

a plurality of voltage transformers each having at least a primary and a secondary winding;

each of said secondary windings being electrically connected in a series circuit with each other and the predetermined lengths of said ferromagnetic pipe to be heated by said wire means;

means for connecting said primary windings to an alternating current source of power;

temperature-responsive means for measuring temperature of the fluid in selected fluid flow pipes; and means, operable by said temperature-responsive means, for connecting into and disconnecting from said series circuit selected ones of said pair of transformers to control the flow of alternating current in said wire means according to the temperature measured by said temperature-responsive means.

8. An electrical heating apparatus which improves control of the heat output, comprising:

ferromagnetic pipe means;

insulated wire means for conducting alternating current extending longitudinally inside said ferromagnetic pipe means and electrically connected in series with said ferromagnetic pipe means;

a plurality of power sources of alternating current;

each of said power sources being connected in a series circuit with each other and predetermined length of said ferromagnetic pipe means by said wire means; and means responsive to the temperature of the fluid in said pipe means for connecting and disconnecting selected ones of said plurality of power sources from said series circuit in response to the temperature of the fluid in said pipe means.

9. The electrical heating apparatus of claim 8 wherein said plurality of power sources is a plurality of transformers each having at least a primary and secondary winding; and said wire means respectively connecting each of said secondary windings to said ferromagnetic pipe means to form the series circuit.

10. The electrical heating apparatus of claim 1 wherein the primary winding of each of said selected ones of said transformers is in series with said means for connecting and disconnecting.

11. an improved heat-generating pipe for electrically heating a fluid in a pipe which improves control of the heat output and permits the use of standard voltage transformers and standard voltage insulated wire comprising:

a pipe for fluids;

a ferromagnetic pipe;

means for attaching said ferromagnetic pipe along said pipe for fluids in a heat-transmitting relationship;

insulated wire means for conducting alternating current extending longitudinally inside said ferromagnetic pipe;

a pair of voltage transformers each having a primary and secondary windings;

each of said secondary windings and ferromagnetic pipe being connected in a series circuit with each other by predetermined lengths of said wire means;

temperature-responsive means for measuring temperature of the fluid in said pipe for fluids;

means operable by said temperature responsive means in response to the temperature of the fluid in said fluid pipe for regulating the power output to said series circuit by placing the secondary winding of one of said pair of transformers in a series aiding or opposing relationship to the secondary winding of other of said pair of transformers.

12. An improved heat-generating pipe for electrically heating a fluid in a pipe which improves control of the heat output and permits the use of standard voltage transformers and standard voltage insulated wire comprising:

a pipe for fluids;

a ferromagnetic pipe;

means for attaching said ferromagnetic pipe along said pipe for fluids in a heat-transmitting relationship thereto;

insulated wire means for conducting alternating current extending longitudinally inside said ferromagnetic pipe;

a pair of voltage transformers each having a primary and secondary windings;

each of said secondary windings being connected in a series circuit with each other and said ferromagnetic pipe by predetermined lengths of said wire means;

temperature-responsive means for measuring temperature of the fluid in said pipe for fluids;

means operable by said temperature responsive means in response to the temperature of the fluid in said fluid pipe for connecting into and disconnecting from said series circuit a selected one of said pair of transformers so as to regulate the power output to said series circuit and control the flow of alternating current in said wire means in response to the temperature of the fluid in said fluid pipe; and wherein said means for connecting and disconnecting includes means responsive to a signal from said temperature-responsive for bypassing a selected one of said pair of transformers so that only one of said pair of said transformers is in said series circuit.

* * * * *

UNITED STATES PATENT AND TRADEMARK OFFICE
CERTIFICATE OF CORRECTION

PATENT NO. : 4,002,881
DATED : January 11, 1977
INVENTOR(S) : James M. West

It is certified that error appears in the above-identified patent and that said Letters Patent are hereby corrected as shown below:

Title Page, first line of title, "ELECTICAL" should be
--ELECTRICAL--.

Col. 9, line 1, "length" should be --lengths--.

Col. 10, line 37, "responsive for" should be --responsive means for--.

Signed and Sealed this

Twenty-fourth Day of May 1977

[SEAL]

Attest:

RUTH C. MASON
Attesting Officer

C. MARSHALL DANN
Commissioner of Patents and Trademarks